US005671106A

United States Patent [19]

Lehureau

[11] Patent Number: 5,671,106
[45] Date of Patent: Sep. 23, 1997

[54] MATRIX MAGNETIC RECORDING/READING HEAD

[75] Inventor: Jean-Claude Lehureau, Ste Genevieve des Bois, France

[73] Assignee: Thomson-CSF, Paris, France

[21] Appl. No.: 557,823

[22] Filed: Nov. 14, 1995

[30] Foreign Application Priority Data

Nov. 25, 1994 [FR] France .................. 94 14146

[51] Int. Cl.[6] ............................. G11B 5/29
[52] U.S. Cl. ........................ 360/121; 360/123
[58] Field of Search ................. 360/113, 115, 360/119, 121, 123, 125, 126

[56] References Cited

U.S. PATENT DOCUMENTS

| | | | |
|---|---|---|---|
| 3,382,325 | 5/1968 | Camras et al. | 360/112 |
| 3,395,401 | 7/1968 | Silverman et al. | 360/32 |
| 3,789,158 | 1/1974 | Walker et al. | 360/123 |
| 4,745,506 | 5/1988 | Nakamura et al. | 360/123 |
| 4,751,598 | 6/1988 | Hamilton | 360/110 |
| 4,787,003 | 11/1988 | Nakamura et al. | 360/123 |
| 4,942,490 | 7/1990 | Lehureau | 360/126 |
| 5,067,230 | 11/1991 | Meunier et al. | 29/603 |
| 5,089,923 | 2/1992 | Lehureau | 360/121 |
| 5,124,869 | 6/1992 | Lehureau | 360/121 |
| 5,189,579 | 2/1993 | Colineau | 360/121 |
| 5,282,104 | 1/1994 | Coutellier et al. | 360/115 |
| 5,420,734 | 5/1995 | Colineau et al. | 360/113 |
| 5,506,737 | 4/1996 | Lin et al. | 360/121 |

FOREIGN PATENT DOCUMENTS

| | | |
|---|---|---|
| 0 199 522 | 10/1986 | European Pat. Off. . |
| 58-68210 | 4/1983 | Japan . |
| 60-38715 | 2/1985 | Japan . |
| 61-292216 | 12/1986 | Japan . |
| 62-20114 | 1/1987 | Japan . |
| WO92/14250 | 8/1992 | WIPO . |

OTHER PUBLICATIONS

Japanese Patent Abstract, 58–37831, Mar. 5, 1983, vol. 7, No. 121 ( p. 199).
Japanese Patent Abstract, 61–39914, Feb. 26, 1986, vol. 10, No. 195 9 p. 4750.
Patent Abstract Of Japan, JP63113906, May 18, 1988, vol. 12, No. 363 ( p. 765).

Primary Examiner—Jefferson Evans
Attorney, Agent, or Firm—Oblon, Spivak, McClelland, Maier & Neustadt, P.C.

[57] ABSTRACT

A magnetic head including a first induction conductor coupled to a second conductor which is coupled into a closed magnetic circuit having a magnetic flux induction coil supplied with a pulsed or alternating current. Instead of a coil, therefore, only the first induction conductor is magnetically coupled with the head. The magnetic head allows for implementation of high density heads with matrix control and can be used in magnetic recording/reading applications.

11 Claims, 9 Drawing Sheets

SECTION aa

SECTION bb

SECTION bb

MATRIX MAGNETIC RECORDING/READING HEAD

BACKGROUND OF THE INVENTION

The invention relates to a magnetic recording/reading head and in particular to an integrated magnetic head made in the form of a matrix head in which the coils are in thin layers.

It also relates to a method for the making of such a head.

A technique such as this can be used to reduce the pitch of the heads and thus achieve higher recording densities.

The French patent No. 2 605 783 describes a method for the making of magnetic heads in thin layers that lends itself well to the making of matrix heads in batches.

The French patent application No. 2 630 853 describes a way of making the coils associated with a matrix of magnetic heads made according to the method of the above-mentioned patent application. Methods have also been described for the making of matrices of thin-layer wound heads especially in the U.S. Pat. No. 3,662,261 to Mee.

The association of a planar technology and a technology of coils made in the form of thin layers comes up against two drawbacks:

it is difficult to connect the coils located on the front face of the component because this face is before the medium. Contacts can be taken only through the substrate and this is technologically difficult;

the electronic control circuits require a maximum number of turns in the thin layer coil so as to limit the writing current. This either results in high electrical resistance that gives rise to a heating of the component or leads to the coil having a greater surface area than that permitted by the pitch desired between writing gaps.

The matrix heads make it possible to obtain not only an information bit rate that is high despite moderate mechanical speeds but also far narrower track densities than are possible with the mechanical repositioning of an individual head on an adjacent track. For example, the precision of repositioning of individual heads with respect to the magnetic tape is in the range of 1 μm for a rotating head, 10 μm for a fixed head and 3 μm for a positionally servo-controlled head. A matrix head does not appear to provide for improved positioning as compared with the tape but enables a precise relative positioning of the tracks recorded simultaneously.

However, the recording of very narrow tracks with a matrix head raises two problems:

the transverse pitch of the gaps (perpendicularly to the direction of shifting of the medium) must of course be equal to the pitch of the tracks multiplied by the number of columns of gaps in the matrix of magnetic heads so as to obtain compact recording;

the longitudinal extension of the head should not exceed typically 300 times the track width so as to obtain packets of tracks with constant pitch despite an azimuth error of the running of the tape which may be in the range of 0.5 mRd.

These considerations make it necessary not to exceed a ratio of 16 between the pitch of the gaps and the pitch of the tracks. Thus, a density of 1000 TPI (3 μm of track width) will necessitate a gap pitch of about 40 μm.

To resolve these different problems, the invention provides for the controlling of each magnetic head by a magnetic field induction conductor in which there flows a control current that is itself induced by a magnetic control circuit.

SUMMARY OF THE INVENTION

The invention therefore relates to a magnetic recording/reading head comprising a first magnetic circuit and at least one first conductor for the induction of a magnetic flux flowing in this magnetic circuit, wherein this conductor is a circuit looped with a second control conductor that goes through a second closed magnetic circuit having a first winding for the induction of a magnetic flux supplied with a pulsed or alternating current.

BRIEF DESCRIPTION OF THE DRAWINGS

The various objects and features of the invention shall appear more clearly from the following description, and from the appended figures, of which.

DETAILED DESCRIPTION OF THE INVENTION

Figure 1A:
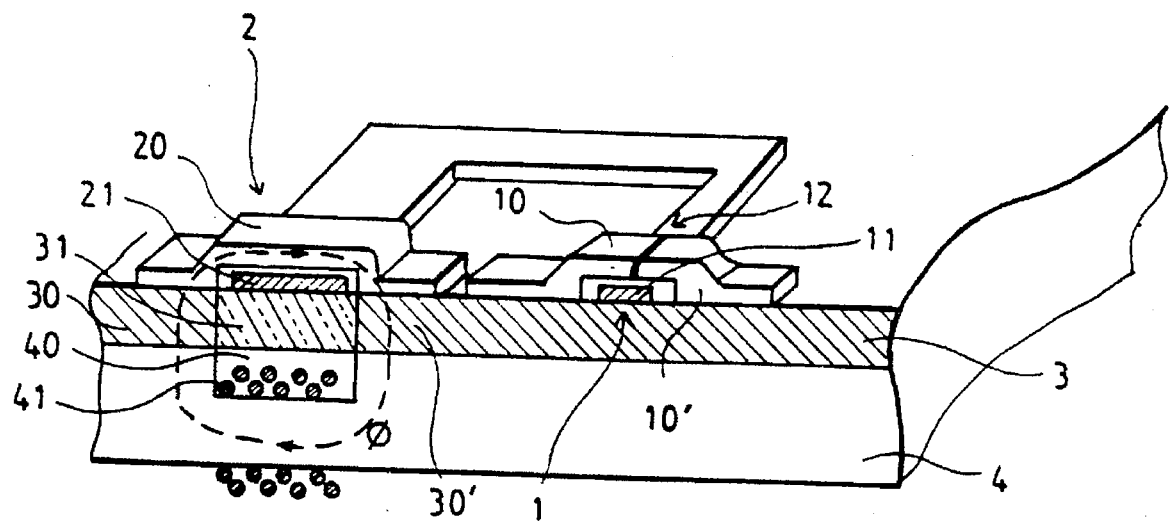
FIGS. 1a and 1b show an exemplary embodiment of a basic magnetic head according to the invention.
Figure 1B:
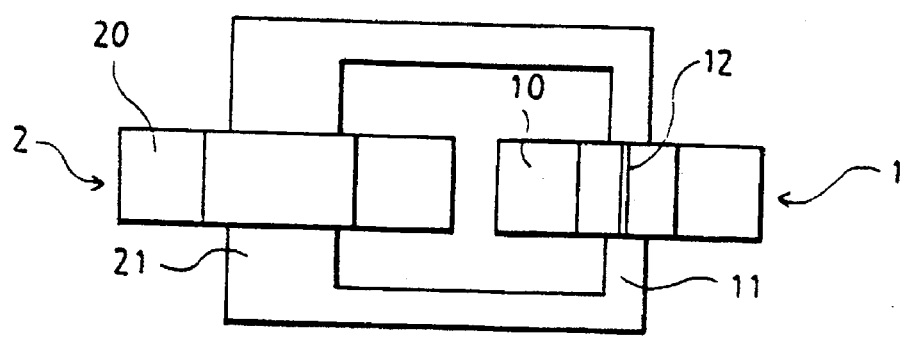

Referring to FIGS. 1a and 1b, a description shall first of all be given of a simplified example of a magnetic recording/reading head. The magnetic head 1 proper is shown in the right-hand part of FIGS. 1a and 1b. It has two magnetic poles 10, 10' separated by a gap 12. The magnetic circuit of these poles is closed by a substrate 3 made of magnetic material. An electrical conductor 11 passes between the poles and the substrate to induce a magnetic flux in the magnetic circuit.

On the left-hand part of FIGS. 1a and 1b there is the control circuit for the magnetic head. It has a conductor 21 connected to the conductor 11 of the magnetic head. As shown in FIG. 1b, the conductors 21 and 11 form a closed loop. The conductor 21 is made on the substrate 3. An element made of magnetic material 20 partially overlaps the conductor 21. This conductor 21 is localized on a portion 31 of the substrate which is made of non-magnetic material beneath the conductor 21. The element 20 sets up a magnetic coupling between the two parts of the substrate 30 and 30', made of magnetic material, located on either side of the portion 31.

To the substrate 3 there is attached a plate 4 having a groove 40 through which there is wound a conductor wire 41 around the plate 4.

The coil 41 is designed to be supplied with a control current. The current then induces a magnetic flux φ in the magnetic circuit formed by the plate 4, the parts 30 and 30' of the substrate 3 and the magnetic element 20. Consequently, the conductor 21 is the seat of an induced current. This current flows in the conductor 12 which induces a magnetic flux in the magnetic head 1.

A magnetic head such as this has the advantage of having only one excitation conductor 11 beneath its magnetic poles 10, 10'. This makes for easy manufacture even when the pitch of the head is very small. The conductor 21 and the coil 41 constitute a transformer. By planning for a sufficient number of turns for the coil 41, it is possible, from a relatively low supply current for the coil, to obtain a high current in the conductor 21 and hence in the conductor 11. It is possible to envisage controlling the coil 41 by means of an electronic circuit without providing for excessive power values.

Figure 2A:
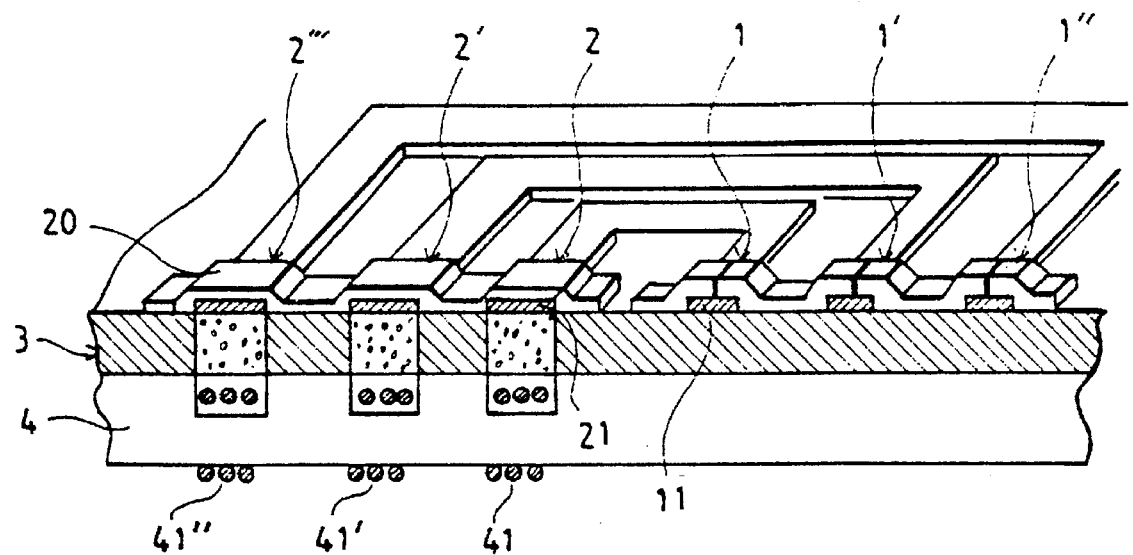
FIGS. 2a and 2b show an exemplary embodiment of a set of magnetic heads.
Figure 2B:
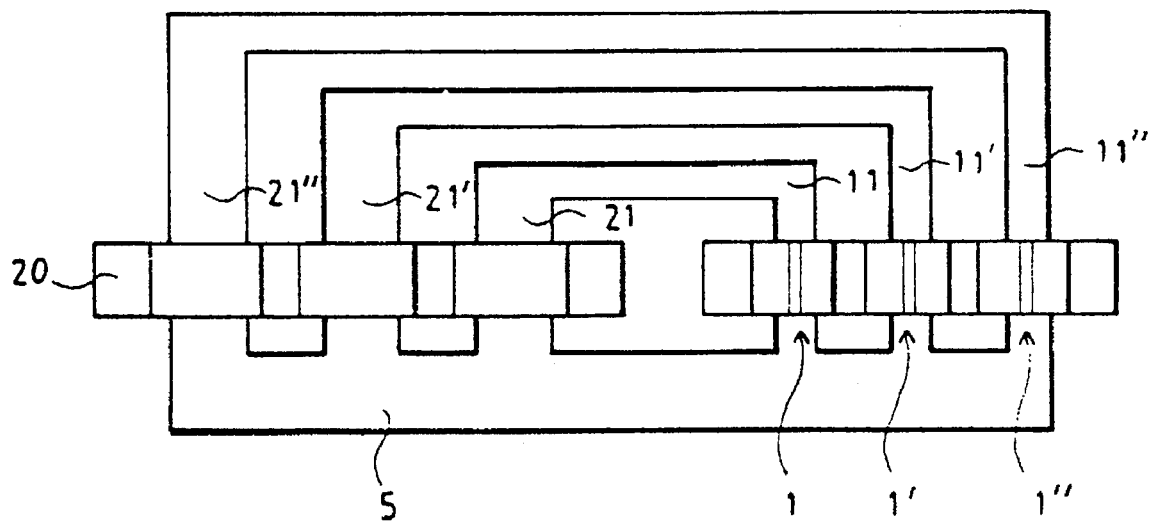

FIGS. 2a and 2b show a set of magnetic heads 1, 1', 1" and their control circuits 2, 2', 2". Each magnetic head and its control circuit is made in the same way as in FIGS. 1a and 1b. The particular features of this exemplary embodiment are that the magnetic substrate 3 may be common for all three magnetic heads, that the magnetic element 20 may be made as a single piece for all three control circuits and that the conductors 11, 11', 11" are connected by a common conductor 5 to the conductors 21, 21', 21".

The coil 41 controls the magnetic head 1, the coil 41' controls the magnetic head 1' and the coil 41" controls the magnetic head 1".

Referring to FIGS. 3a to 9b, we shall now describe an exemplary embodiment of the magnetic heads according to the invention made in matrix form.

Figure 3A:
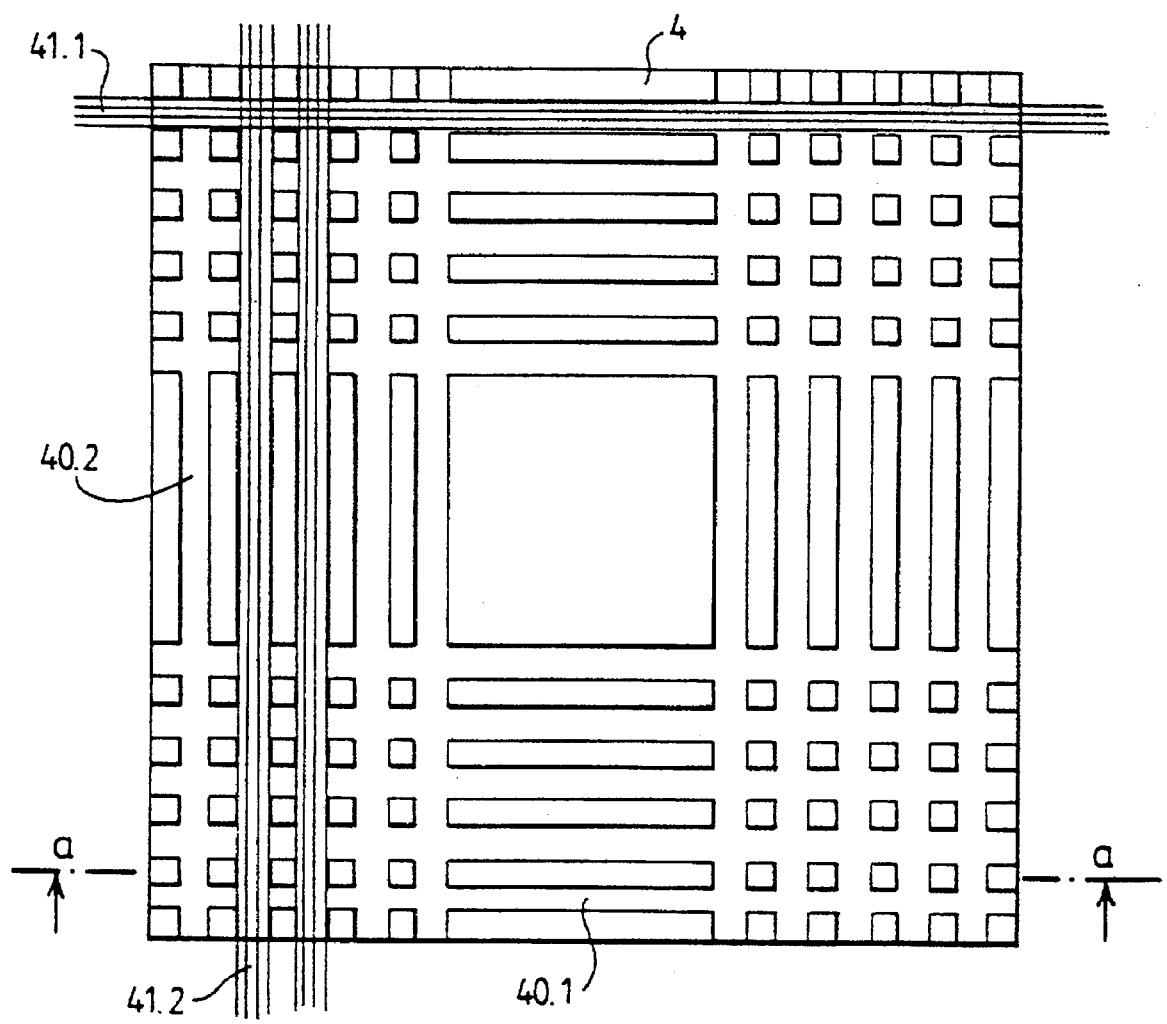
FIGS. 3a and 3b show a plate of magnetic material provided with excitation coils.
Figure 3B:
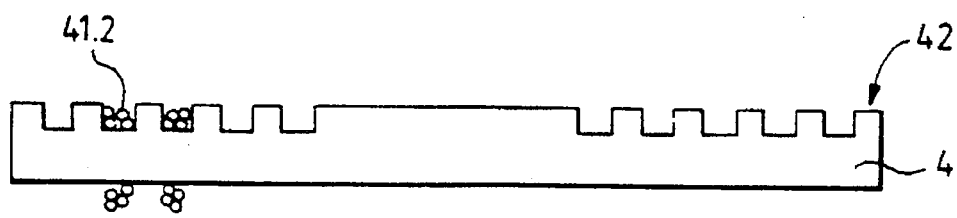

FIGS. 3a and 3b show a plate 4 made of magnetic material comprising, in its face 42, horizontal grooves 40.1 and vertical grooves 40.2. A coil passes through each groove and surrounds the plate by passing through the face opposite the face 42. There is thus shown a horizontal coil 41.1 and two vertical coils such as 41.2.

Figure 4A:
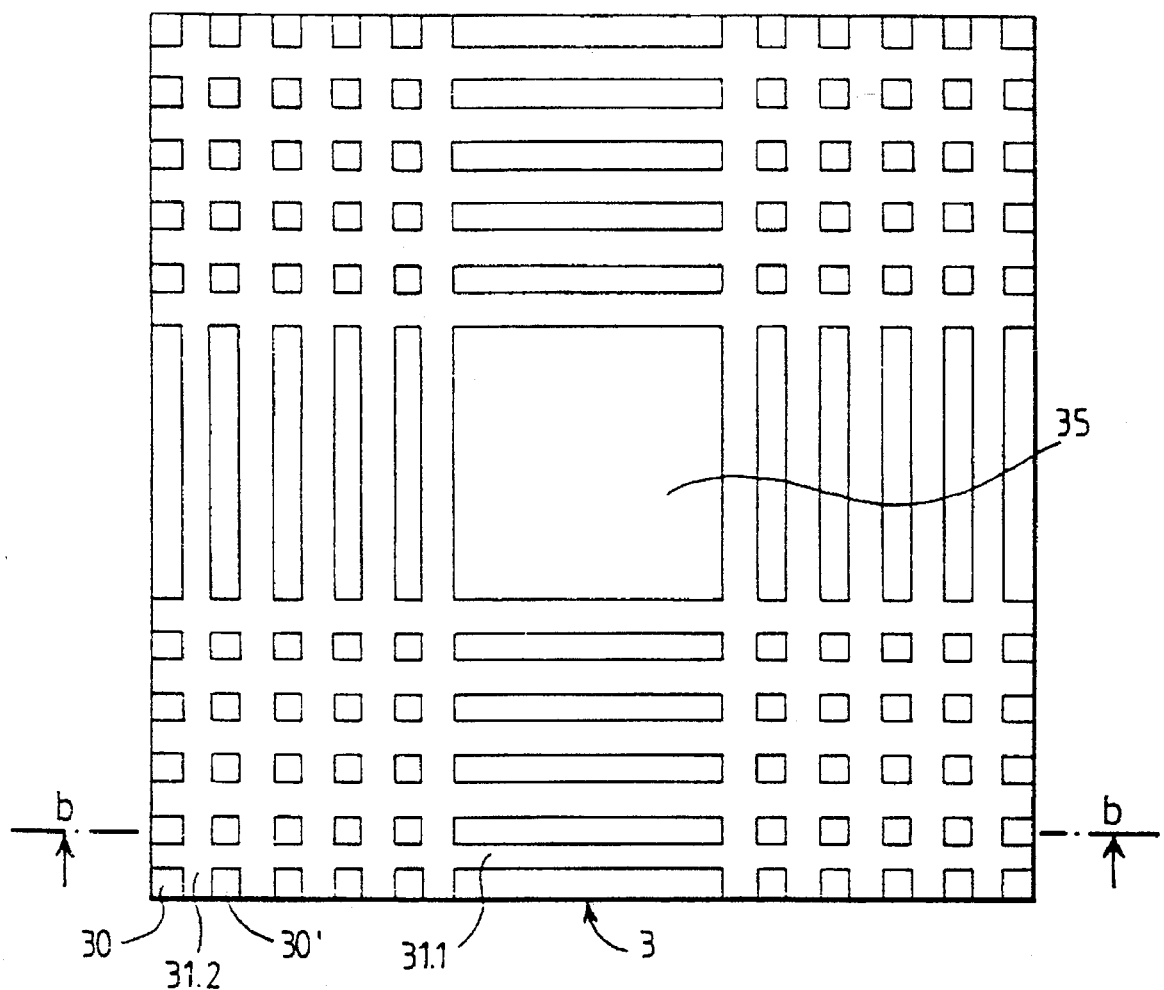
FIGS. 4a and 4b show a plate of glass-ferrite composite material used as a substrate of the component.
Figure 4B:
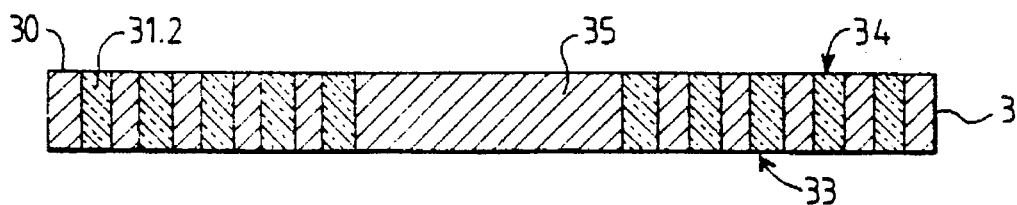

To the face 42 of the plate 4, there is attached a substrate plate 3 such as the one shown in FIGS. 4a and 4b. This plate is formed by horizontal bands such as 31.1 and vertical bands such as 31.2 made of a non-magnetic material (glass for example). These bands correspond to the grooves of the plate 4. Between the horizontal and vertical bands, there is magnetic material such as 30 and 30'. The central part 35 of the substrate plate 3 has a square surface made of magnetic material. The plate 3 is attached by its face 33 to the face 42 of the plate 4.

Figure 5:
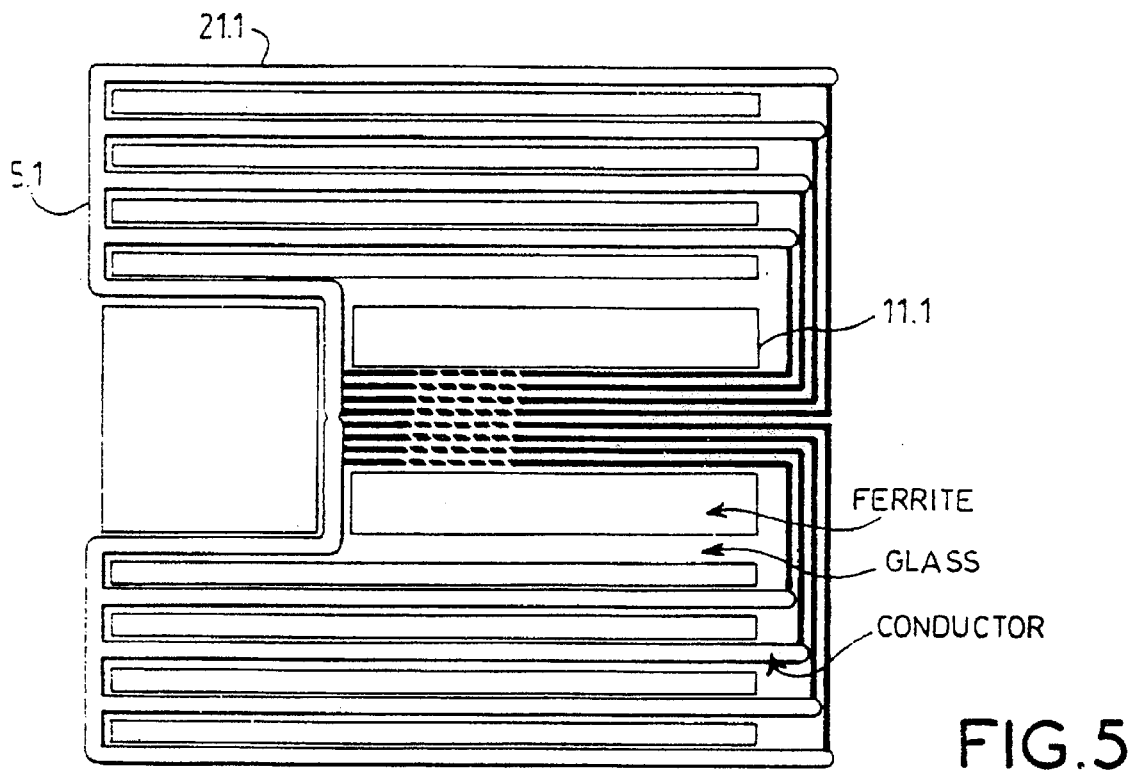
FIGS. 5 and 6 show a geometry of conductors in thin layers enabling a matrix of magnetic heads to be addressed.

An array of conductors 21.1 is made on the face 34. A horizontal conductor 21.1 is made above each band of non-magnetic material 31.1 as shown in FIG. 5. On the upper part of the face 34, there are provided, for example, four conductors and in the lower part there are provided four conductors.

Eight parallel conductors 11.1 are then provided with each having one end connected to a conductor 21.1. The other ends of the conductors 21.1 are connected by the conductor 5.1 to the free ends of the conductors 11.1.

The entire unit is covered with a layer of insulator material. An array of vertical conductors 21.2 and 11.2 is made above the insulator (see FIG. 6). This array is similar to that of FIG. 5 but is oriented by 90° with respect to the conductors 21.1 and 11.1. The conductors 21.2 are located above the non-magnetic vertical bands 31.2. The entire unit is again covered with an insulating layer. The conductors 11.1 and 11.2 form the control conductors of a matrix of magnetic heads.

Figure 7A:
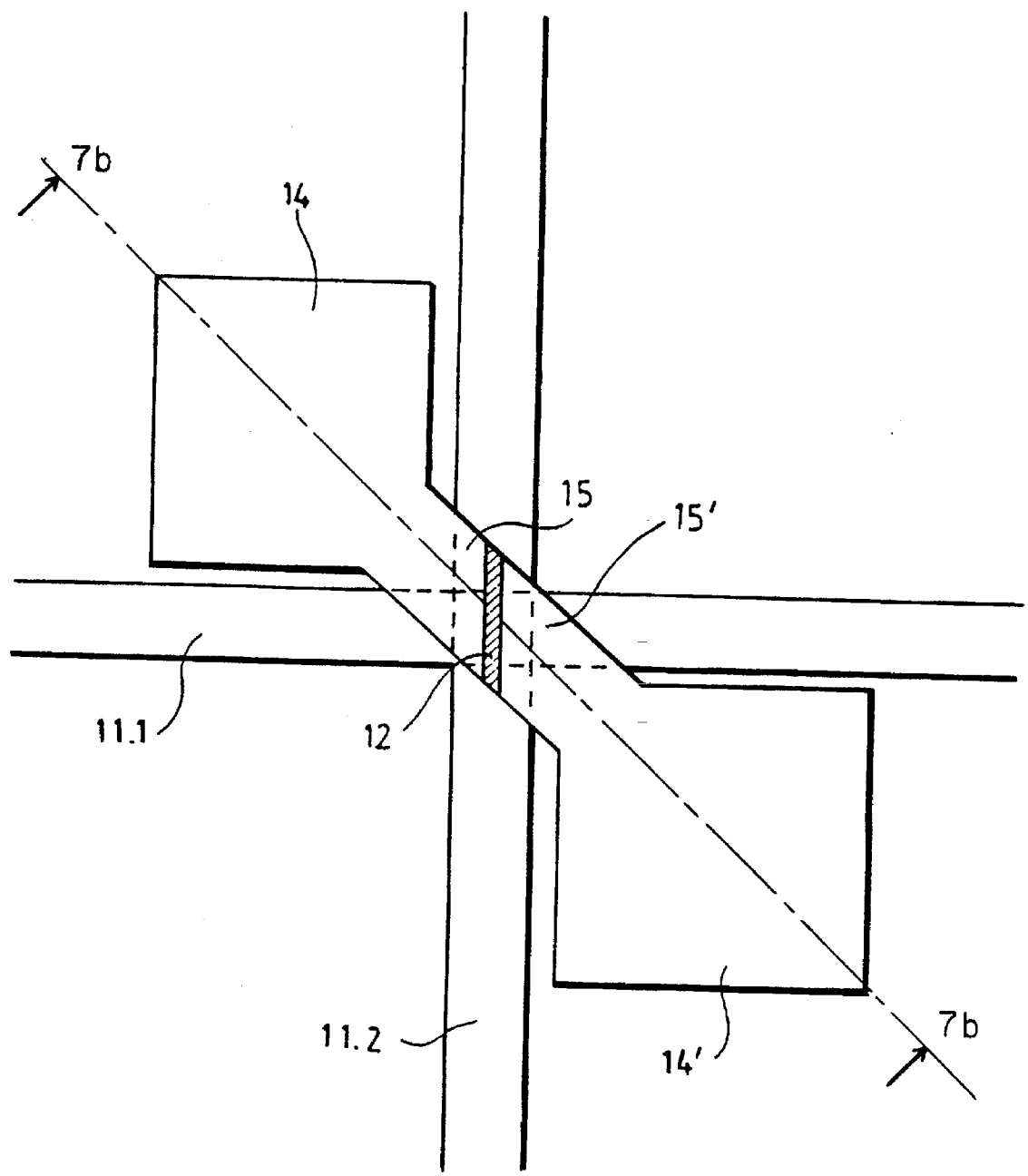
FIGS. 7a and 7b show a magnetic head located at a point of intersection of a matrix of heads.

Indeed, above each point of intersection of the conductors 11.1 and 11.2, magnetic heads are made. Each magnetic head has two magnetic poles 10 and 10' preferably made in a thin layer by means of a material with very high magnetic permeability (for example, sendust, i.e. an alloy of aluminium, iron and tin). The two magnetic poles are separated by a gap 12. They have, for example, a geometry as shown in FIG. 7a each having a part 14, 14' with a relatively large surface area. The two parts 14, 14' are located diagonally with respect to the point of intersection. Two narrow elements 15, 15' interrupted by the gap 12 join the parts 14, 14'.

Figure 7B:
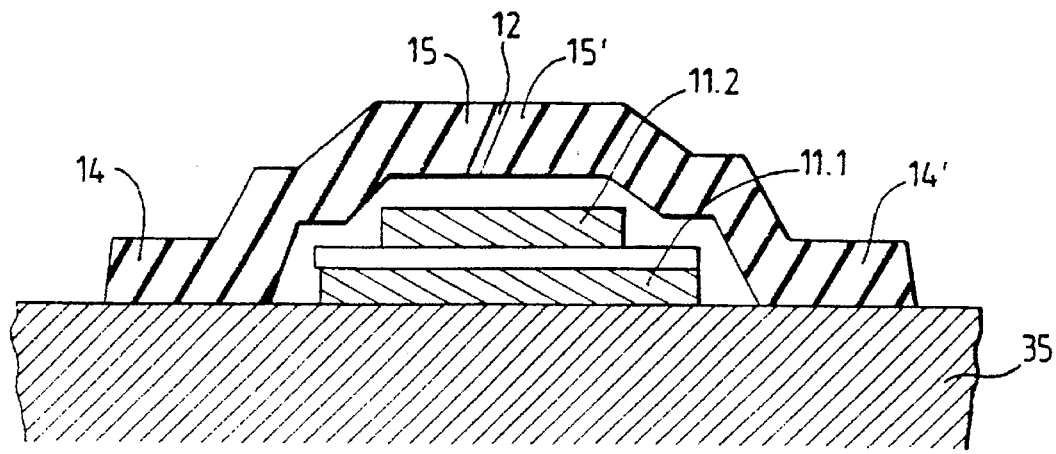

Preferably, as can be seen in the section cc of FIG. 7b, the parts of magnetic poles 14 and 14' are in direct contact with the zone 35 made of magnetic material of the substrate 3. For this purpose, the layers of insulator material deposited on the conductors 11.1 and 11.2 have been etched at the location of these parts 14 and 14'.

Figure 8:
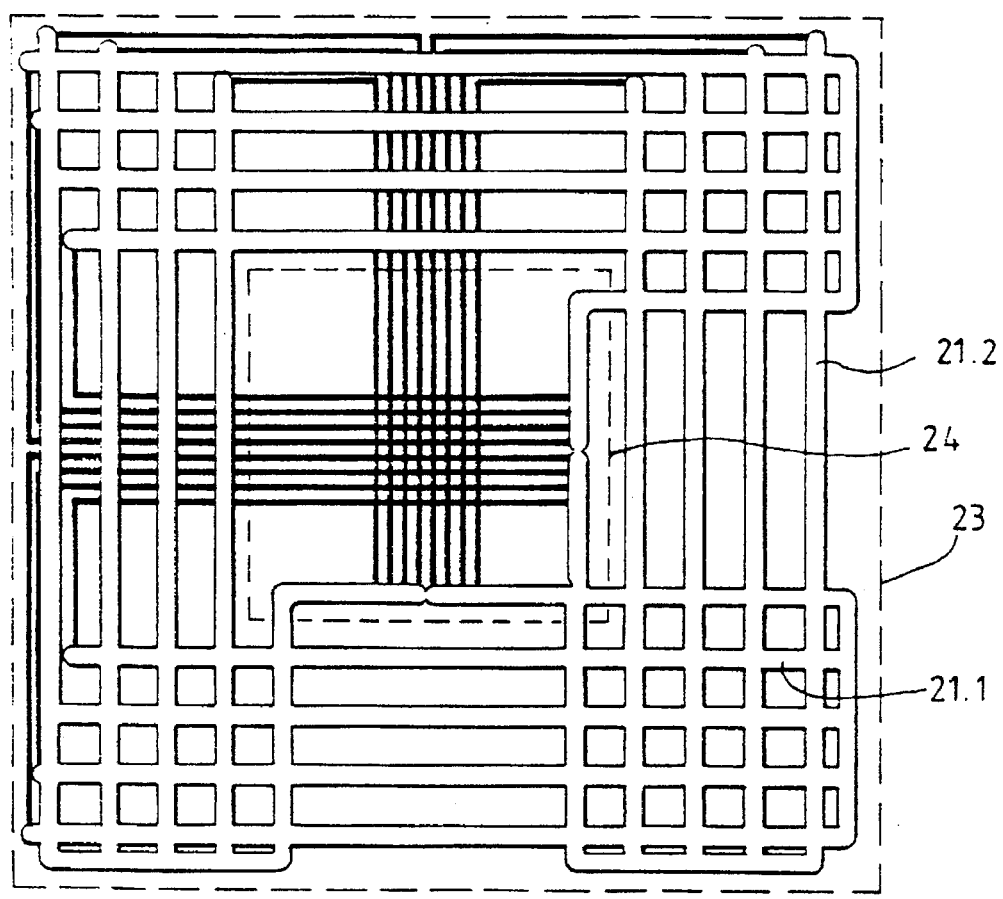
FIG. 8 shows two arrays of superimposed conductors enabling a matrix command to be made.

Finally, the conductors 21.1 and 21.2 are covered with a magnetic layer 20 to close the magnetic circuit above each conductor in a manner similar to what has been shown in FIG. 1a. In FIG. 8, the arrays of superimposed conductors 21.1 and 21.2 have been shown. The magnetic layer 20 is demarcated by the dashes 23 and 24 and is between these dashes above the conductors 21.1 and 21.2.

Thus, according to the invention, the making of the thin layer conductors of the magnetic head proves to be technologically far simpler than the making of a multiple-turn coil.

It is not necessary to provide for the return of the internal end of the wire by means of another thin layer, separated by an insulating layer in which zones have been etched enabling the resumption of contact.

The absence of a return wire in thin layer form provides for a gain by a factor of 2 in the resistance and hence in the thermal dissipation.

The manufacturing rule is less restrictive and enables the etching of layers that are thicker and hence less resistive.

The invention thus makes it possible to send a control signal to the front face of the component and to perform the transformer functions needed for the use of a single-turn thin layer coil.

The substrate shown in FIGS. 4a and 4b is obtained by the sawing of a ferrite block, filling with glass and thinning by polishing. It differs from the prior art structure in that the passage of the fluxes is done through the peripheral part. The central part on which the magnetic heads are deposited is a ferrite monolith. Furthermore, the fluxes transferred to the front face are no longer the 1×c fluxes corresponding to each coil intersection and the corresponding gap but only the 1+c fluxes corresponding to the 1 horizontal coils and the c vertical coils.

The matrix arrangement of these 1+c fluxes is obtained by the conductive layers shown in FIG. 9. The variation of flux encircling each of the peripheral upright structures of the circuit elements generates potentials in these elements inducing a current that flows in the central part.

As has been seen, FIG. 1a shows the elements in which this flux flows. These are the ferrite block 4 which is grooved and wound on the rear face, the glass-ferrite composite unit 3 used as a substrate and a thin layer of magnetic material 20 covering the thin layer turn 21 on the front face. This layer 20 is preferably deposited at the same time as the layers 10, 10' forming the magnetic head. The flux that may be induced in the circuit is limited by the saturation of this thin layer (in the range of 1 Tesla). On a 5 mm groove and a 4 μm layer, a flux of 20 nWb may be induced. The variation of this flux at 15 MHz induces a voltage of 2 volts in the thin layer circuit. If the resistance of the turn is less than 10 ohms, a current sufficient for the writing may be induced. This corresponds typically to a layer with a resistivity of 0.1 $ohm^2/cm$. This is equivalent to a fraction of a micron for a layer made of a good conductor such as copper, gold or aluminium.

The structure of the magnetic head differs little from the structure described in the patent application 2 605 783. For moderate magnetic head pitch values, it is not indispensable to hollow out the insulating layers (as in FIG. 8) used for the separation of the conductive circuits. For very small pitch values (of some tens of microns), it is preferable to do so as shown in FIG. 8 so as to properly close the magnetic circuit.

The making of a matrix magnetic head thus described could be done in the following method.

Orthogonal grooves 40.1 and 40.2 are made in a plate 4 of magnetic material. In each groove, there is made an excitation coil 41.1, 41.2 that goes into the groove and on the face opposite the grooves (FIGS. 3a and 3b).

Figure 9A:
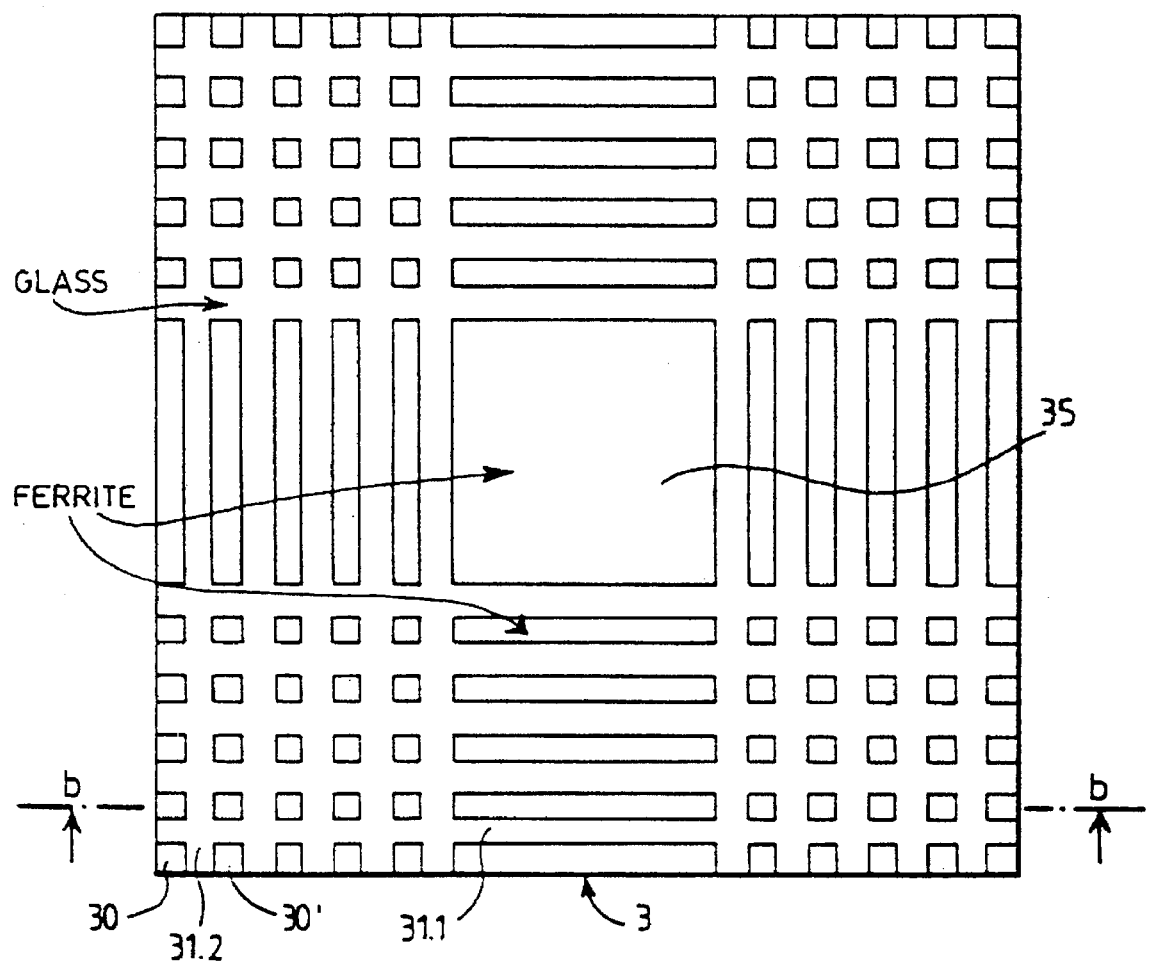
FIGS. 9a and 9b show the substrate, made of magnetic material, of a matrix of magnetic heads.
Figure 9B:
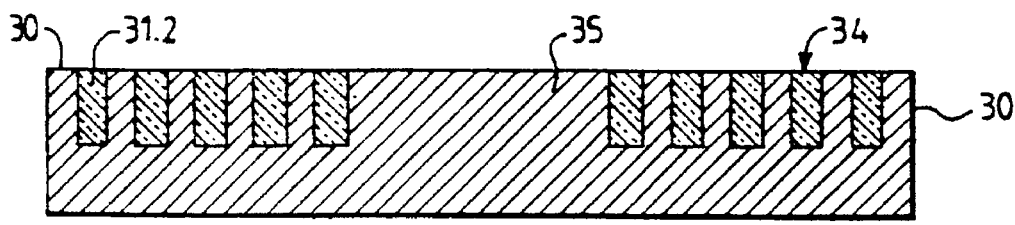

Furthermore, grooves are made in a substrate plate made of magnetic material 3 and filled with a non-magnetic material 31.1, 31.2 (see FIGS. 9a and 9b). The face opposite the grooves is machined to obtain the face 33 of FIG. 4b. This machining can be done now or subsequently.

Figure 10A:
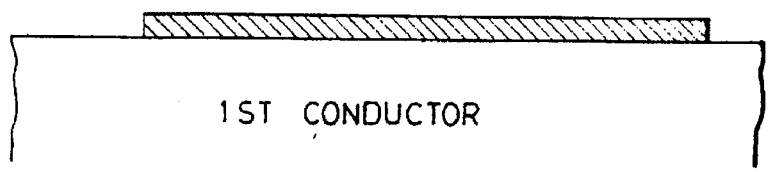
FIGS. 10a to 10e show certain steps of a method of manufacture according to the invention.

The horizontal control conductors 21.1 as well as the induction conductors 11.1 are made on the horizontal bands 31.1 of non-magnetic material, as shown in FIG. 5. FIG. 10a shows a sectional view of an induction conductor 11.1 for example.

Figure 10B:
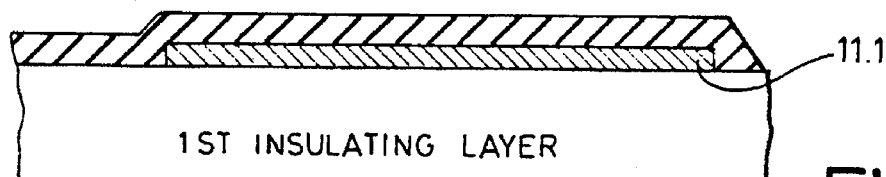

As shown in FIG. 10b, the unit is covered with an insulator layer especially above the zone 35 where the induction conductors 11.1 and 11.2 must intersect.

Figure 6:
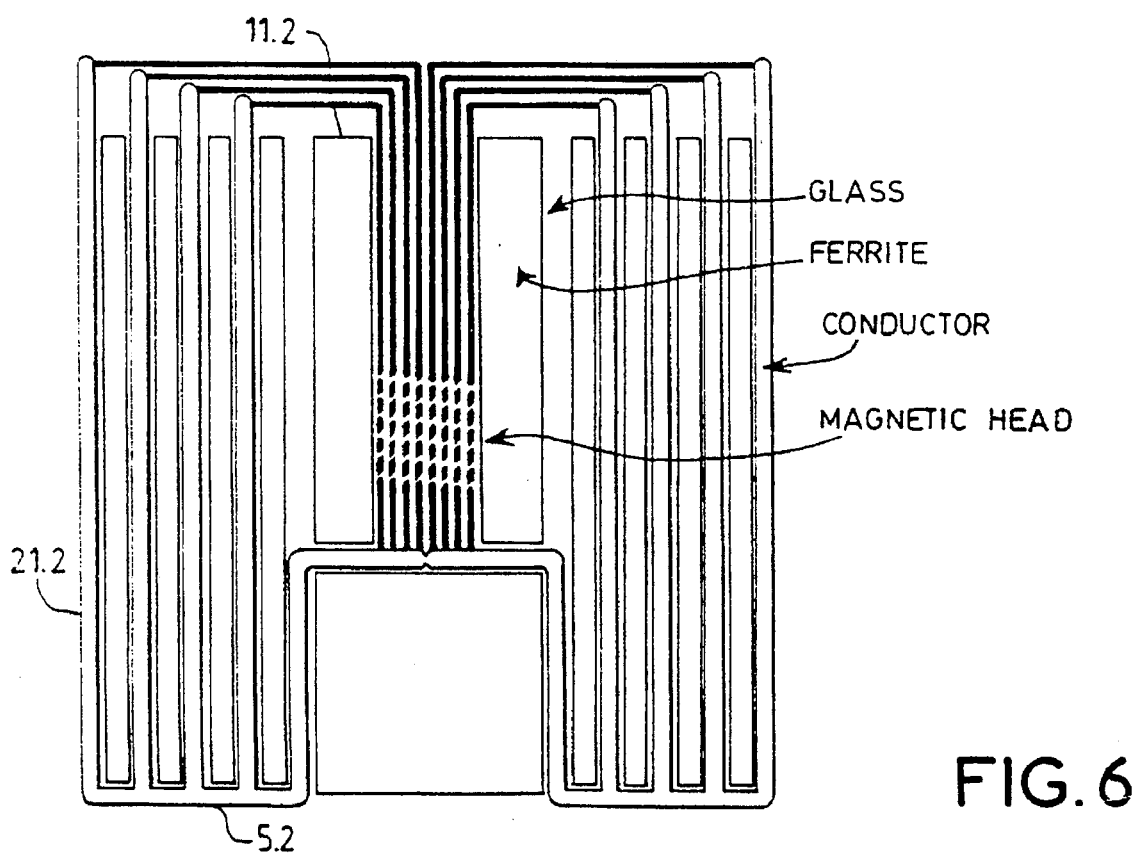
Figure 10C:
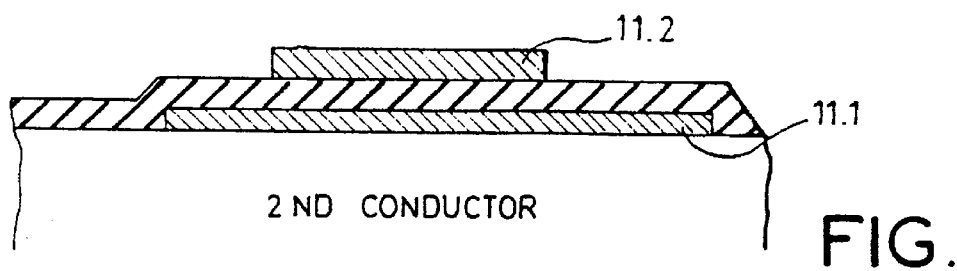

The vertical control conductors 21.2 as well as the vertical induction conductors 11.2 are then made as shown in FIG. 6. FIG. 10c shows a sectional view of a point of intersection between a horizontal induction conductor 11.1 and a vertical induction conductor 11.2.

Figure 10D:
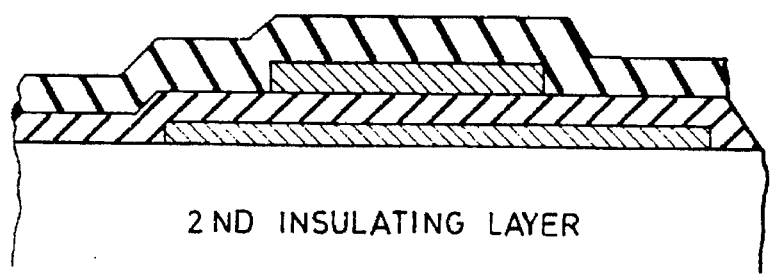
Figure 10E:
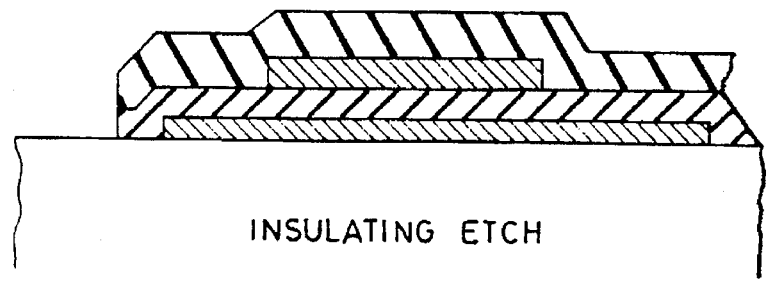

The entire unit is again covered with an insulating layer (FIG. 10d). The two insulating layers deposited previously are then etched (FIG. 10e) diagonally on either side of each point of intersection to gain access to the central zone 35, made of magnetic material, of the substrate 3.

Then the different magnetic heads as shown in FIG. 8 are made, for example according to the technique described in the patent application No. 2 605 783. In the same operation, it is possible to cover the control conductors 21.1 and 21.2 with a layer of magnetic material.

Finally, the previously wound plate 4 is attached by its face 42 to the face 33 of the plate of the substrate 3 opposite the one having the magnetic heads and the conductors so as to obtain continuity in the magnetic control circuits and so that the coils are substantially below the bands of non-magnetic material 31.2 of the substrate plate 3.

What is claimed is:

1. A magnetic recording/reading head comprising:
    a substrate made of magnetic material and having first and second faces;
    at least one first magnetic circuit covered by a first layer of material of high magnetic permeability, having a gap forming a magnetic head, and including,
        at least one first conductor located on the first face of the substrate; and
        at least one second magnetic circuit, including,
            at least one first control conductor coupled to the at least one first conductor and covered by a second layer of material having high magnetic permeability;
            at least one first winding supplied with a pulsed or alternating current for producing a first magnetic flux in the at least one second magnetic circuit;
    the first magnetic flux producing a current flowing in a circuit formed by the at least one first conductor coupled to the at least one first control conductor; and
    the current flowing in the at least one first conductor inducing a second magnetic flux in the first magnetic circuit.

2. A magnetic head according to claim 1, comprising:
    one first conductor;
    one first control conductor;
    one first magnetic circuit;
    one second magnetic circuit; and
    the one second magnetic circuit having a plurality of first windings.

3. A magnetic head according to claim 1, wherein the first layer and the second layer of material with high magnetic permeability are one and the same layer of material.

4. A magnetic head according to claim 1, further comprising:
    a plate made of magnetic material attached to the second face of the substrate opposite the first face, and having grooves around which the at least one winding of the second magnetic circuit is wound.

5. A magnetic head according to claim 1, comprising:
    at least one second conductor perpendicular to the at least one first conductor and defining a point of intersection, the at least one first magnetic circuit having the magnetic head located at the point of intersection;
    at least one second control conductor coupled to the at least one second conductor;
    at least a second winding associated with the at least one second control conductor.

6. A magnetic head according to claim 1, comprising:
    several first magnetic circuits;
    several first conductors parallel with one another and magnetically coupled with the first magnetic circuits having magnetic heads;
    several first control conductors parallel with one another and coupled with a respective first conductor; and
    several first windings magnetically coupled with a respective first control conductor.

7. A magnetic head according to claim 6, comprising:
    several second conductors parallel to one another and perpendicular to the first conductors;
    each intersection of a first conductor and a second conductor defining a point of intersection;
    the first magnetic circuits having magnetic heads located at the point of intersection;
    the first and second conductors being insulated from each other;
    several second control conductors coupled with a respective second conductor; and
    several second windings magnetically coupled with a respective second control conductor.

8. A magnetic head according to claim 7, wherein the second control conductors are perpendicular to the first control conductors.

9. A magnetic head according to claim 8, wherein the first and second conductors intersect in a parallelepiped-shaped zone and wherein the first and second control conductors are located outside this zone, the first control conductors being parallel to a first side of the parallelepiped shape and the second control conductors being parallel to the second side of the parallelepiped shape not parallel to the first side.

10. A magnetic head according to claim 9, wherein the first control conductors are distributed on either side of the parallelepiped-shaped zone and wherein the second conductors are distributed on either side of the parallelepiped-shaped zone.

11. A magnetic head according to claim 1, wherein the at least one first control conductor is located on the first face of the substrate and the substrate is non-magnetic beneath the at least one first control conductor.

* * * * *